Aug. 27, 1935.    W. L. SAVELL    2,012,406
CHLORINATING DEVICE FOR WATER
Filed Sept. 19, 1933
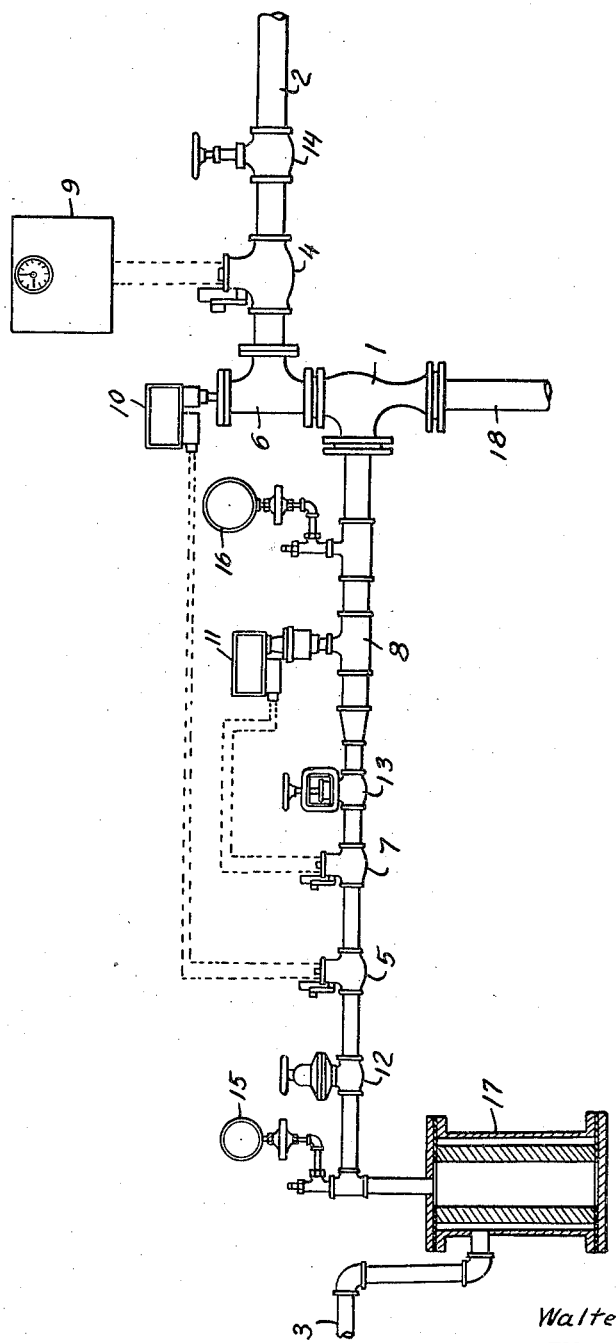
INVENTOR
*Walter L. Savell*
BY
*Pennie, Davis, Marvin & Edmonds*
ATTORNEYS Patented Aug. 27, 1935

2,012,406

UNITED STATES PATENT OFFICE 2,012,406

CHLORINATING DEVICE FOR WATER

Walter Lee Savell, Forest Hills, N. Y., assignor to The Mathieson Alkali Works, Inc., New York, N. Y., a corporation of Virginia Application September 19, 1933, Serial No. 690,102

2 Claims. (Cl. 210—28)

This invention provides a device for periodically chlorinating water which has several advantages.

The device comprises an eductor, a water supply connection arranged to discharge into the inlet port of the eductor and a chlorine supply connection arranged to discharge into the suction port of the eductor, a time controlled valve in the water supply connection, valving means in the chlorine supply connection responsive, primarily, to the pressure in the water supply connection at a point between the time controlled valve and the eductor and, secondarily, to the pressure in the chlorine supply connection at a point between the valving means and the eductor. The valving means may consist of a single dual purpose valve or of two valves. Where a single dual purpose valve is used the pressure in the water supply connection is made the dominant control and where two valves are used the operation of the secondary valve, responsive to the pressure in the chlorine supply connection, is made subject to that of the primary valve, responsive to the pressure in the water supply connection. The dual purpose valve or the primary valve in the chlorine supply connection is arranged to open when the pressure in the water supply connection between the time controlled valve and the eductor exceeds a predetermined value and to close when that pressure is below that value. The dual purpose valve, subject to the primary control, or the secondary valve in the chlorine supply connection is arranged to open as the pressure in the chlorine supply connection between that valve and the eductor diminishes and to close as that pressure increases.

The accompanying drawing illustrates, diagrammatically and conventionally, a device embodying the invention. In the accompanying drawing, 1 is an eductor, 2 is the water supply connection, 3 is the chlorine supply connection, 4 is the time controlled valve in the water supply connection, 5 is the primary valve in the chlorine supply connection responsive to the pressure in the water supply connection in the fitting 6 between the valve 4 and the eductor 1, and 7 is the secondary valve in the chlorine supply connection responsive to the pressure in the chlorine supply connection in the fitting 8 between this valve 7 and the eductor 1. 9 is a conventional clock operated valve controlling mechanism. 10 is a conventional pressure operated valve controlling mechanism adapted to open the valve 5 when the pressure in the fitting 6 exceeds a predetermined value and to close this valve when that pressure is below that value. 11 is a conventional pressure operated valve controlling mechanism adapted to open the valve 7 as the pressure in the fitting 8 diminishes and to close this valve as that pressure increases. 12, 13 and 14 are supplementary control valves, and 15 and 16 are pressure gauges. 17 is an appropriate filter, a conventional carbon filter for example. 18 is the discharge connection from the eductor 1. The valves 5 and 7 are with advantage arranged as shown, but the relative positions of these valves in the connection 3 may be reversed.

In operation, water is discharged through the eductor 1 at intervals determined by the clock mechanism 9. The pressure exerted by water flowing through the fitting 6 opens valve 5 whenever such flow occurs. The primary valve 5 remains closed, however, except when such flow is occurring, whether the valve 4 is closed or whether the valve 4 is opened and flow fails for some other reason, through operation of the pressure mechanism 10. The clock mechanism 9 thus controls the discharge of chlorine, indirectly, and cannot function to effect such discharge of chlorine except into a stream of water flowing through the eductor 1. The proportioning of the chlorine to the water is controlled by the joint operation of the eductor 1, the secondary valve 7 and the pressure mechanism 11. Flow of water through the eductor 1 effects a diminution of pressure in the chlorine supply connection between the valve 7, or valve 13, and the eductor 1 roughly proportional to the volume of water flowing through the eductor, a function of the water pressure, and the valve 7, through operation of the pressure mechanism 11, then proportions the flow of chlorine to the flow of water.

Valves 5 and 7 may be replaced by a single dual purpose valve so connected to the pressure mechanisms 10 and 11 that it is closed, through operation of the pressure mechanism 10 independently of the operation of the pressure mechanism 11, except for periods during which a stream of water is flowing through the eductor 1 and that, subject to this control by the pressure mechanism 10, it proportions the chlorine to the water in the same manner as valve 7, through operation of the pressure mechanism 11.

The device thus provides automatic control of the periods of chlorination, automatic control of the proportioning of chlorine to water during chlorination over a wide range of variation in water pressure, and automatic protection against discharge of chlorine if the water pressure is for any reason insufficient.

Chlorine may be supplied to connection 3, for example, from any conventional liquid chlorine container.

The device is of general application for periodic chlorination of water. It is useful, for example, in connection with the chlorination of condensing water in steam powered generating stations to prevent the development and growth of algæ in the condensers, etc.

I claim:

1. In combination in a device for periodically chlorinating water, an eductor, a water supply connection arranged to discharge into the inlet port of said eductor a chlorine supply connection arranged to discharge into the suction port of said eductor, a time controlled valve in said water supply connection, a primary valve in said chlorine supply connection responsive to the pressure in said water supply connection at a point between said time controlled valve and said eductor, and a secondary valve in said chlorine supply connection responsive to the pressure in said chlorine supply connection at a point between said secondary valve and said eductor.

2. In combination in a device for periodically chlorinating water, an eductor, a water supply connection arranged to discharge into the inlet port of said eductor, a chlorine supply connection arranged to discharge into the suction port of said eductor, a time controlled valve in said water supply connection, and valving means in said chlorine supply connection responsive primarily to the pressure in said water supply connection at a point between said time controlled valve and said eductor and secondarily to the pressure in said chlorine supply connection at a point between said valving means and said eductor.

WALTER LEE SAVELL.